(12) United States Patent
Hymowitz

(10) Patent No.: US 9,002,317 B2
(45) Date of Patent: Apr. 7, 2015

(54) METHOD AND APPARATUS FOR ACTIVE DEFENSE AND EMERGENCY RESPONSE

(71) Applicant: Pangaea Services, Inc., Pebble Beach, CA (US)

(72) Inventor: Steven Allen Hymowitz, Pebble Beach, CA (US)

(73) Assignee: Pangaea Services, Inc., Lewes (DE)

( * ) Notice: Subject to any disclaimer, the term of this patent is extended or adjusted under 35 U.S.C. 154(b) by 0 days.

(21) Appl. No.: 13/629,482

(22) Filed: Sep. 27, 2012

(65) Prior Publication Data
US 2014/0087681 A1 Mar. 27, 2014

(51) Int. Cl.
*H04M 11/04* (2006.01)
*H04W 4/22* (2009.01)
*G06F 3/00* (2006.01)

(52) U.S. Cl.
CPC *H04W 4/22* (2013.01); *G06F 3/005* (2013.01)

(58) Field of Classification Search
USPC ........ 455/404.1, 456.1, 456.3, 521, 418, 411, 455/404.2, 566; 340/426.1, 539.11, 527, 340/540, 628
See application file for complete search history.

(56) References Cited

U.S. PATENT DOCUMENTS

| | | | |
|---|---|---|---|
| 6,633,231 B1 * | 10/2003 | Okamoto et al. | ........ 340/539.11 |
| 7,937,066 B2 | 5/2011 | Kaltsukis | |
| 8,013,734 B2 | 9/2011 | Saigh et al. | |
| 8,116,724 B2 | 2/2012 | Peabody | |
| 8,310,360 B2 | 11/2012 | Ross, Jr. et al. | |
| D681,768 S | 5/2013 | Ross, Jr. et al. | |
| D688,769 S | 8/2013 | Lord | |
| 2003/0169161 A1 | 9/2003 | Brown et al. | |
| 2004/0005914 A1 | 1/2004 | Dear | |
| 2006/0061478 A1* | 3/2006 | Kim | .............................. 340/628 |
| 2006/0217105 A1* | 9/2006 | Kumar et al. | .............. 455/404.1 |
| 2007/0155412 A1 | 7/2007 | Kaltsukis | |
| 2008/0020794 A1* | 1/2008 | Garon et al. | ................ 455/556.1 |
| 2009/0093229 A1 | 4/2009 | Grunow et al. | |
| 2009/0096620 A1* | 4/2009 | Kuo | .............................. 340/628 |
| 2009/0191850 A1 | 7/2009 | Cardwell, III et al. | |
| 2011/0046920 A1 | 2/2011 | Amis | |
| 2011/0195701 A1 | 8/2011 | Cook et al. | |
| 2012/0052836 A1 | 3/2012 | Buratti et al. | |
| 2012/0087482 A1 | 4/2012 | Alexander, Sr. | |

* cited by examiner

*Primary Examiner* — Kiet Doan
(74) *Attorney, Agent, or Firm* — Van Pelt, Yi & James LLP

(57) ABSTRACT

A method and an apparatus comprise establishing a communications link with a mobile computing device. A user's intent to initiate a deterrent on an individual is recognized. An image capture device to capture at least one image in response to the user's intent to initiate a deterrent is activated. At least the image is transferred, via the communications link, to the mobile computing device in which the mobile computing device establishes a connection to at least an emergency unit and at least transmits the image and information regarding the user to the emergency unit. A releasing of the deterrent in response to the user's intent to initiate a deterrent is recognized. Broadcasting an audible alert in response to the user's intent to initiate a deterrent.

18 Claims, 12 Drawing Sheets

METHOD AND APPARATUS FOR ACTIVE DEFENSE AND EMERGENCY RESPONSE

CROSS-REFERENCE TO RELATED APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

One or more embodiments of the invention generally relate to communication systems. More particularly, one or more embodiments of the invention relate to deterrent devices associated with communication systems.

BACKGROUND OF THE INVENTION

Deterrents (e.g. pepper spray, mace, etc.) are available for personal protection.

In view of the foregoing, it is clear that these traditional techniques are not perfect and leave room for more optimal approaches.

BRIEF DESCRIPTION OF THE DRAWINGS

The present invention is illustrated by way of example, and not by way of limitation, in the figures of the accompanying drawings and in which like reference numerals refer to similar elements and in which.

Figure 1:
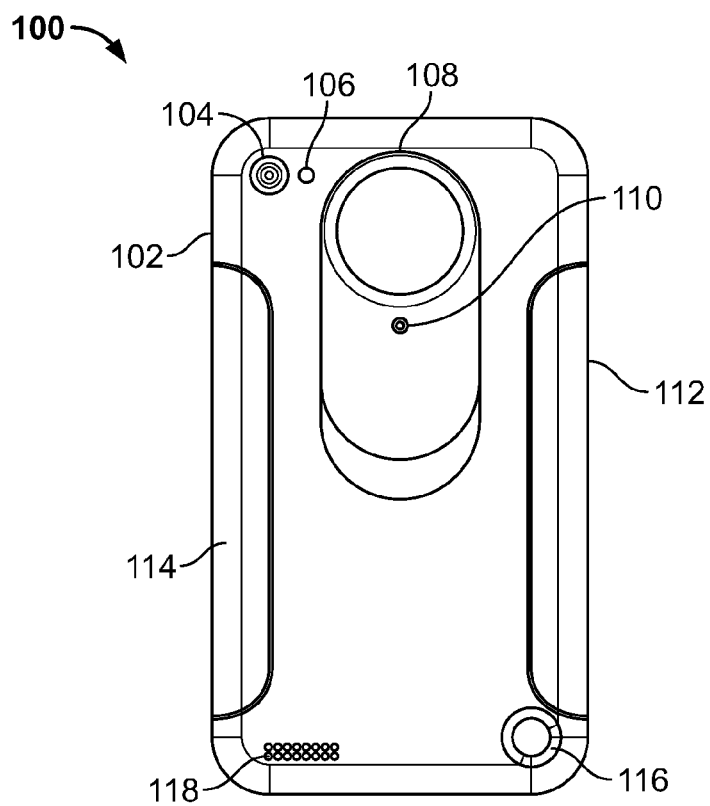
FIG. 1 illustrates a front view for an example device, in accordance with an embodiment of the present invention.

Unless otherwise indicated illustrations in the figures are not necessarily drawn to scale.

DETAILED DESCRIPTION OF SOME EMBODIMENTS

Embodiments of the present invention are best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present application or of any further application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

A "computer" may refer to one or more apparatus and/or one or more systems that are capable of accepting a structured input, processing the structured input according to prescribed rules, and producing results of the processing as output. Examples of a computer may include: a computer; a stationary and/or portable computer; a computer having a single processor, multiple processors, or multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer (PC); a personal digital assistant (PDA); a portable telephone; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

"Software" may refer to prescribed rules to operate a computer. Examples of software may include: code segments in one or more computer-readable languages; graphical and or/textual instructions; applets; pre-compiled code; interpreted code; compiled code; and computer programs.

A "computer-readable medium" may refer to any storage device used for storing data accessible by a computer. Examples of a computer-readable medium may include: a magnetic hard disk; a floppy disk; an optical disk, such as a CD-ROM and a DVD; a magnetic tape; a flash memory; a memory chip; and/or other types of media that can store machine-readable instructions thereon.

A "computer system" may refer to a system having one or more computers, where each computer may include a computer-readable medium embodying software to operate the computer or one or more of its components. Examples of a computer system may include: a distributed computer system for processing information via computer systems linked by a network; two or more computer systems connected together via a network for transmitting and/or receiving information between the computer systems; a computer system including two or more processors within a single computer; and one or more apparatuses and/or one or more systems that may accept data, may process data in accordance with one or more stored software programs, may generate results, and typically may include input, output, storage, arithmetic, logic, and control units.

A "network" may refer to a number of computers and associated devices that may be connected by communication facilities. A network may involve permanent connections such as cables or temporary connections such as those made through telephone or other communication links. A network may further include hard-wired connections (e.g., coaxial cable, twisted pair, optical fiber, waveguides, etc.) and/or wireless connections (e.g., radio frequency waveforms, free-space optical waveforms, acoustic waveforms, etc.). Examples of a network may include: an internet, such as the Internet; an intranet; a local area network (LAN); a wide area network (WAN); and a combination of networks, such as an internet and an intranet.

Exemplary networks may operate with any of a number of protocols, such as Internet protocol (IP), asynchronous transfer mode (ATM), and/or synchronous optical network (SONET), user datagram protocol (UDP), IEEE 802.x, etc.

Embodiments of the present invention may include apparatuses for performing the operations disclosed herein. An apparatus may be specially constructed for the desired purposes, or it may comprise a general-purpose device selectively activated or reconfigured by a program stored in the device.

Embodiments of the invention may also be implemented in one or a combination of hardware, firmware, and software. They may be implemented as instructions stored on a machine-readable medium, which may be read and executed by a computing platform to perform the operations described herein.

In the following description and claims, the terms "computer program medium" and "computer readable medium" may be used to generally refer to media such as, but not limited to, removable storage drives, a hard disk installed in hard disk drive, and the like. These computer program products may provide software to a computer system. Embodiments of the invention may be directed to such computer program products.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, and as may be apparent from the following description and claims, it should be appreciated that throughout the specification descriptions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

A non-transitory computer readable medium includes, but is not limited to, a hard drive, compact disc, flash memory, volatile memory, random access memory, magnetic memory, optical memory, semiconductor based memory, phase change memory, optical memory, periodically refreshed memory, and the like; however, the non-transitory computer readable medium does not include a pure transitory signal per se.

Devices and systems will be described which provide means and methods for providing wireless self-defense/emergency response capabilities. Furthermore, device may communicate wirelessly (e.g. Bluetooth) with a computing device (e.g. smartphone) for communicating information to the monitoring system and/or emergency authorities (e.g. police, fire, ambulance, etc.) in order to notify the monitor system and/or emergency authorities of an emergency situation. Furthermore, monitoring system may communicate information received from device to emergency authorities. As a non-limiting example, a picture or image may be captured of an assailant or potential assailant for communication to emergency authorities. As a non-limiting example, picture/image information may be communicated via a text message and/or an email message from computing device (e.g. smartphone). Furthermore, picture/image information may be communicated via Short Message Service (SMS) and/or Microsoft Media Server (MMS). Furthermore, geographic location information (e.g. Global Positioning System (GPS)) may be communicated from computing device to monitoring system and/or emergency authorities. Furthermore, picture/image information may be communicated to a predetermined list of contacts associated with user (e.g. family, etc.). Furthermore, text information may be communicated from device to monitoring service and/or emergency authorities related to the need for possible assistance. Device may operate to broadcast an audio message informing an assailant or a possible assailant that his/her image/picture has been captured and communicated to emergency authorities. Furthermore, device may operate to broadcast an audible alarm in order to deter an assailant or possible assailant and to notify other persons in the vicinity of the device. Furthermore, broadcast audio information and audible alarm may be rebroadcast at a periodic interval. Device may also operate to notify medical personal of a medical emergency. As a non-limiting example, a different selection device may be made available for performing notification associated with medical emergencies. Furthermore, a text message email message may be communicated to medical emergency personnel informing them of the medical emergency. Furthermore, geographic location information may be communicated to emergency personnel. Furthermore, picture/image information of the user may also be communicated in a medical emergency situation. Furthermore, additional information associated with user may be communicated (e.g. medical condition, age, gender, address, etc.). Monitoring system may operate to support receiving and processing information from device and computing device 24 hours a day and seven days a week. Device deploys a deterrent (e.g. pepper spray, mace, taser, etc.) when selected by user. As a non-limiting example, deterrent may be deployed via a spraying mechanism. Furthermore, information from device may be communicated to computing devices (e.g. smartphone) associated with emergency authorities (e.g. law enforcement, medical personnel, etc.).

FIG. 1 illustrates a front view for an example device, in accordance with an embodiment of the present invention.

A device 100 provides security via communication and reception of information and via a deterrent mechanism. Non-limiting examples of information communicate include pictures, images, video and audio. Non-limiting examples for a deterrent mechanism include pepper spray, mace and taser.

Device 100 includes an enclosure 102, a camera 104, a power indicator 106, a deterrent initiator 108, a deterrent facilitator 110, a hand grip 112, a hand grip 114, an attachment mechanism 116 and an audio output portion 118.

Enclosure 102 provides an enclosure for mechanically containing components associated with device 100. Camera 104 provides capability for capturing images and video (e.g. digital picture). Light sensor 106 provides light sensing for camera 104. Deterrent initiator 108 initiates application of deterrent. Deterrent facilitator 110 enables application of deterrent. Hand grip 112 provides a grip for enabling a human to grip device 100. Hand grip 114 provides a grip for enabling a human to grip device 100. Attachment mechanism 116 provides a mechanical means for attaching other devices (e.g. key ring). Audio output portion 118 provides for communication of audio information (e.g. speaker, bell, etc.).

In operation, a user (not shown) grips device 100 via hand grip 112 and hand grip 114. Camera 104 captures images and/or video and communicates the images and/or video information via a wireless communication channel. Audio output portion 118 announces the communication of the images and/or video information. Deterrent may be applied via selection of deterrent initiator 108 with deterrent being applied via deterrent facilitator 110. In some embodiments application of deterrent is initiated following communication of images and/or video information. To deploy deterrent, user may insert finger into deterrent initiator 108 and apply a downward force.

FIG. 1 illustrates an example device where an indication of active mode may be presented, device may be gripped, images and video may be captured and communicated, audio information may be presented and deterrent may be initiated and applied.

Figure 2:
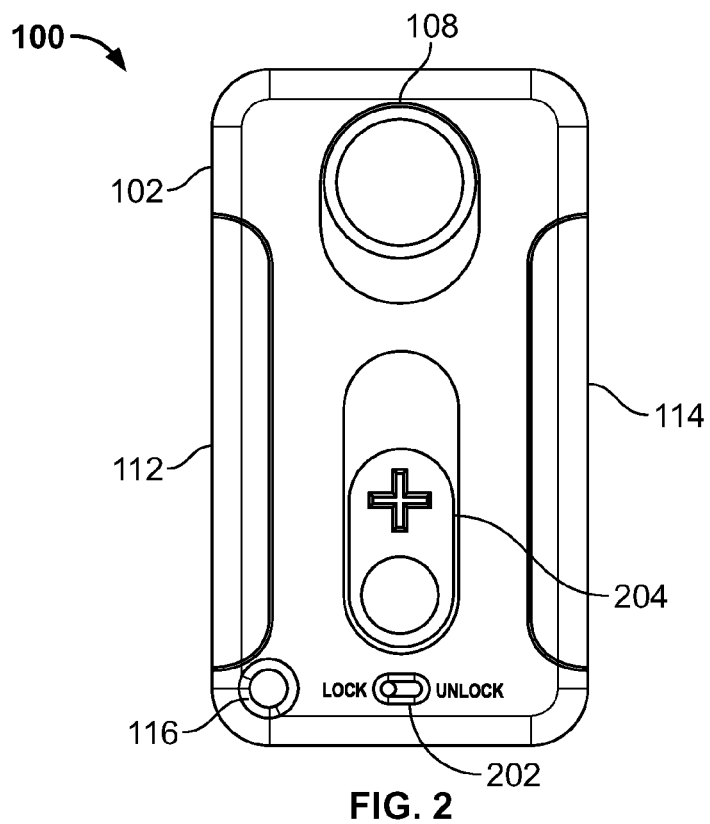
FIG. 2 illustrates a rear view for the example device as described with reference to FIG. 1, in accordance with an embodiment of the present invention.

FIG. 2 illustrates a rear view for the example device as described with reference to FIG. 1, in accordance with an embodiment of the present invention.

In addition to the elements described with reference to FIG. 1, device 100 includes a lock/unlock selection 202 and a medical emergency selection 204.

Lock/unlock selection 202 provides for locking or unlocking the capabilities provided by device 100. In lock mode, medical emergency selection 204 is disabled preventing accidental activation. In unlock mode, selection of medical emergency selection 204 may initiate communication of information via a wireless communication channel to indicate a medical emergency.

In operation, selection of lock/unlock selection 202 in lock mode prevents accidental communication of images and text messages and email messages that may be communicated to medical emergency personnel. Selection of lock/unlock selection 202 in unlock mode enables communication of images and text messages and email messages that may be communicated to medical emergency personnel.

FIG. 2 illustrates a rear view for the example device as described with reference to FIG. 1 where selection of medical emergency selection 204 may provide communication of text messages and email messages that may be communicated to medical emergency personnel. Activation of medical emergency selection 204 may be locked or unlocked via lock/unlock selection 202.

Figure 3:
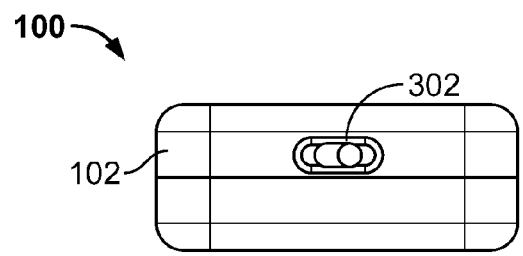
FIG. 3 illustrates a top view for the example device as described with reference to FIGS. 1-2, in accordance with an embodiment of the present invention.

FIG. 3 illustrates a top view for the example device as described with reference to FIGS. 1-2, in accordance with an embodiment of the present invention.

In addition to the elements described with reference to FIGS. 1-2, device 100 includes an on/off selection 302.

On/off selection 302 enables or disables operation of device 100.

When on/off selection 302 is configured in the "on" mode, the operation device 100 is enabled. When on/off selection 302 is configured in the "off" mode, the operation of device 100 is not enabled. Furthermore, when on/off selection 302 is in the "off" mode, device 100 does not consume power for operation.

FIG. 3 illustrates a top view for the example device as described with reference to FIGS. 1-2 where an on/off selection enables or disables operation of the device.

Figure 4:
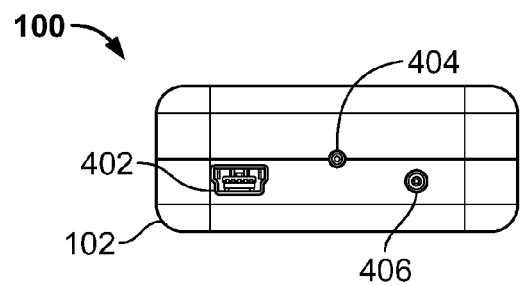
FIG. 4 illustrates a bottom view for the example device as described with reference to FIGS. 1-3, in accordance with an embodiment of the present invention.

FIG. 4 illustrates a bottom view for the example device as described with reference to FIGS. 1-3, in accordance with an embodiment of the present invention.

In addition to the elements described with reference to FIGS. 1-3, device 100 includes an optional communication portion 402, an optional reset selection 404 and a power supply input 406.

Optional communication portion 402 provides capability for communicating with external devices. As a non-limiting example, communication portion 402 may be configured as Universal Serial Bus (USB). Optional reset selection 404 provides capability for applying a hardware reset. Power supply input 406 provides for reception of electrical power for operating device 100 and for recharging an internal battery (not shown).

In operation, a cable may be inserted into communication portion 402 and connected to a second device in order to provide communication between device 100 and the second device. When on/off selection 302 (as shown in FIG. 3) is in the "on" mode, selection of reset selection 404 provides a hardware reset. When a power connection is supplied via power supply input 406, power is provided for operation of device 100 and an internal battery (not shown) may be recharged FIG. 4 illustrates a bottom view for the example device as described with reference to FIGS. 1-3 where, optionally, communication with an external device may be performed via a communication cable, an optional hardware reset may be performed and power may be applied for operation and recharging an internal battery.

Figure 5:
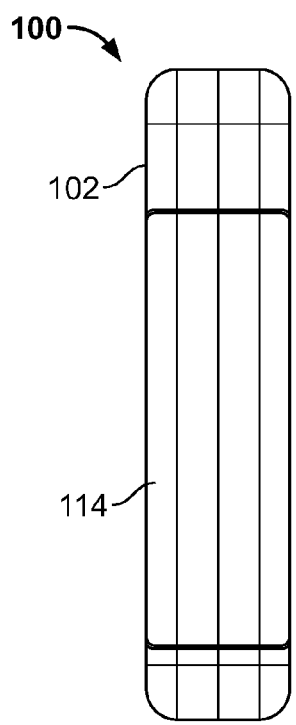
FIG. 5 illustrates a left side view for the example device as described with reference to FIG. 1, in accordance with an embodiment of the present invention.

FIG. 5 illustrates a left side view for the example device as described with reference to FIG. 1, in accordance with an embodiment of the present invention.

As illustrated, hand grip 114 is attached to enclosure 102 which enables a human hand to grip device 100

FIG. 5 illustrates a left side view for the example device as described with reference to FIG. 1 where a hand grip is attached to the enclosure.

Figure 6:
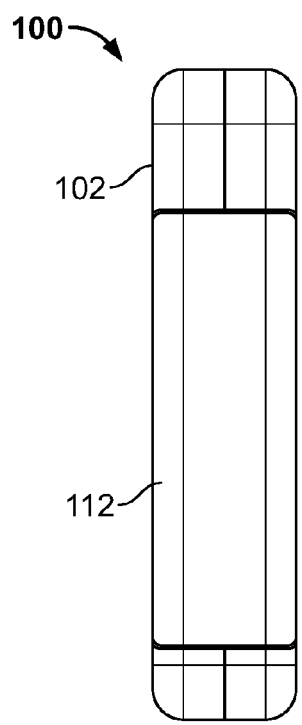
FIG. 6 illustrates a right side view for the example device as described with reference to FIG. 1, in accordance with an embodiment of the present invention.

FIG. 6 illustrates a right side view for the example device as described with reference to FIG. 1, in accordance with an embodiment of the present invention.

As illustrated, hand grip 112 is attached to enclosure 102 which enables a human hand to grip device 100

FIG. 6 illustrates a right side view for the example device as described with reference to FIG. 1 where a hand grip is attached to the enclosure.

Figure 7:
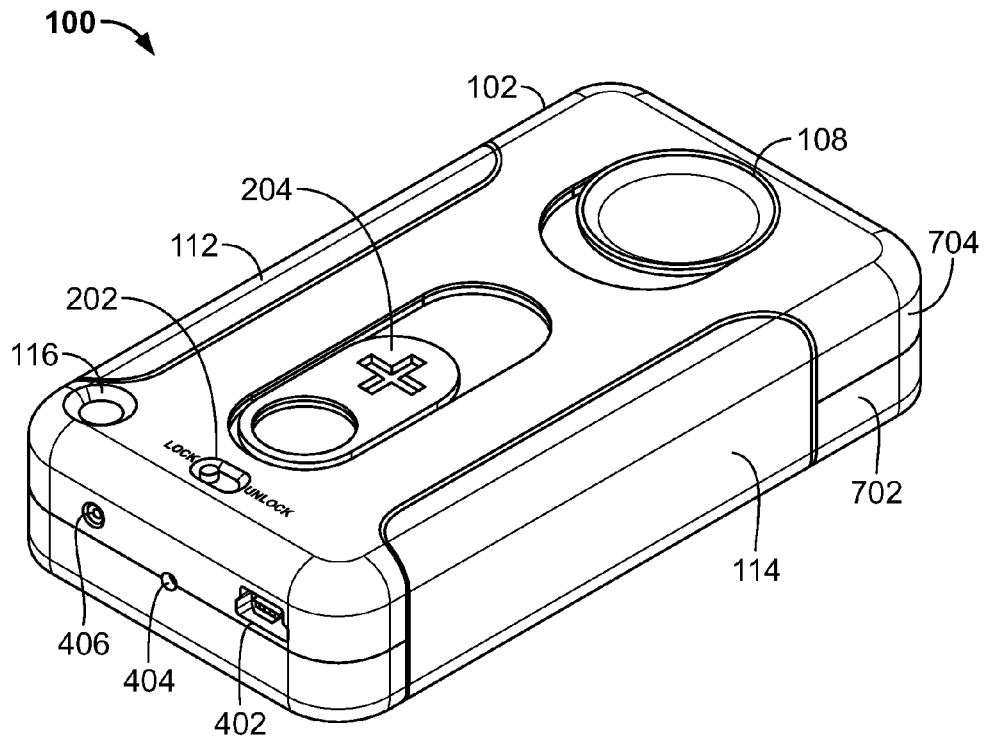
FIG. 7 illustrates a rear/bottom isometric view for the example device as described with reference to FIGS. 1-6, in accordance with an embodiment of the present invention.

FIG. 7 illustrates a rear/bottom isometric view for the example device as described with reference to FIGS. 1-6, in accordance with an embodiment of the present invention.

Enclosure 102 includes a front enclosure portion 702 and a rear enclosure portion 704. Front enclosure portion 702 may be separate from rear enclosure portion 704 in able to provide access insertion, removal and repair of components associated with enclosure 102.

FIG. 7 illustrates a rear/bottom isometric view for the example device as described with reference to FIGS. 1-6 where an enclosure may be configured as a front portion and a rear portion in order to provide access for insertion, removal and repair of associated components.

Figure 8A:
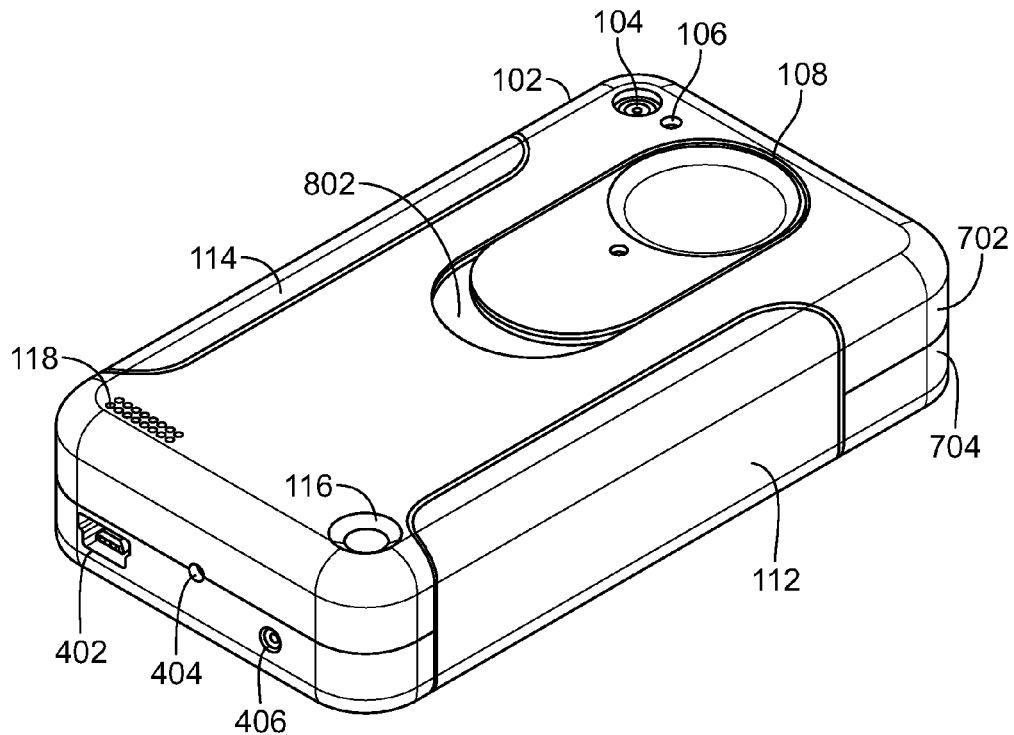
FIG. 8A illustrates a rear/bottom isometric view for the example device as described with reference to FIGS. 1-7, in accordance with an embodiment of the present invention.

FIG. 8A illustrates a rear/bottom isometric view for the example device as described with reference to FIGS. 1-7, in accordance with an embodiment of the present invention.

Deterrent initiator 108 resides in a slot 802. Slot 802 provides an avenue or guide for movement of deterrent initiator 108. During initiation of deterrent, deterrent initiator 108 is pushed down via physical force along slot 802.

FIG. 8A illustrates a rear/bottom isometric view for the example device as described with reference to FIGS. 1-7 where a slot provides a path for deterrent initiator.

Figure 8B:
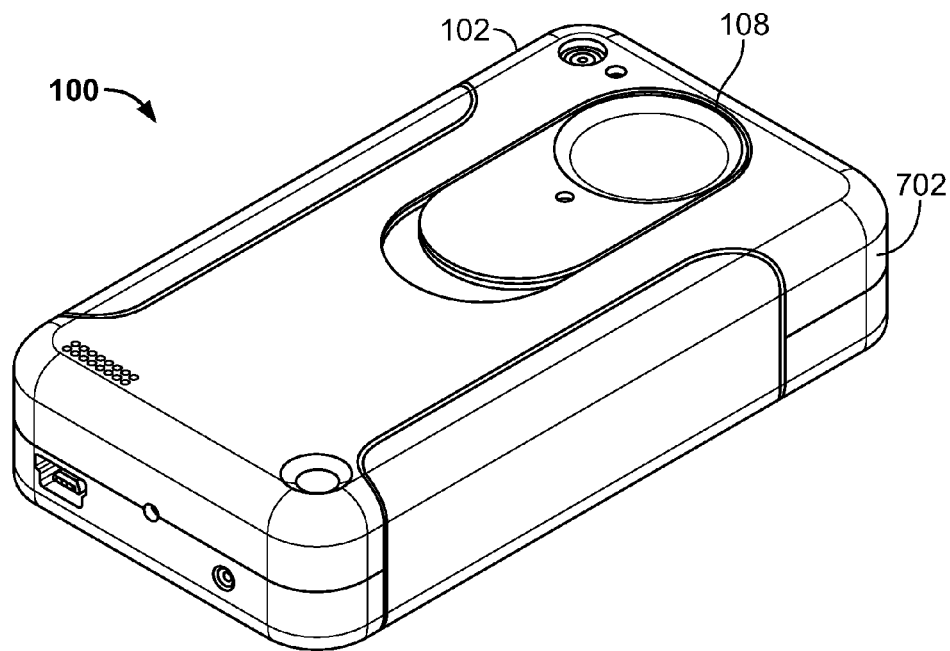
FIG. 8B illustrates a rear/bottom perspective view for the example device as described with reference to FIGS. 1-7, in accordance with an embodiment of the present invention.

FIG. 8B illustrates a rear/bottom perspective view for the example device as described with reference to FIGS. 1-7, in accordance with an embodiment of the present invention.

In order to provide contrast for the operation of deterrent initiator 108, Deterrent initiator 108 may be configured with a different color than the color of front enclosure portion 702.

FIG. 8B illustrates a rear/bottom perspective view for the example device as described with reference to FIGS. 1-7 where the deterrent initiator may be configured with a different color than the front enclosure portion.

Figure 8C:
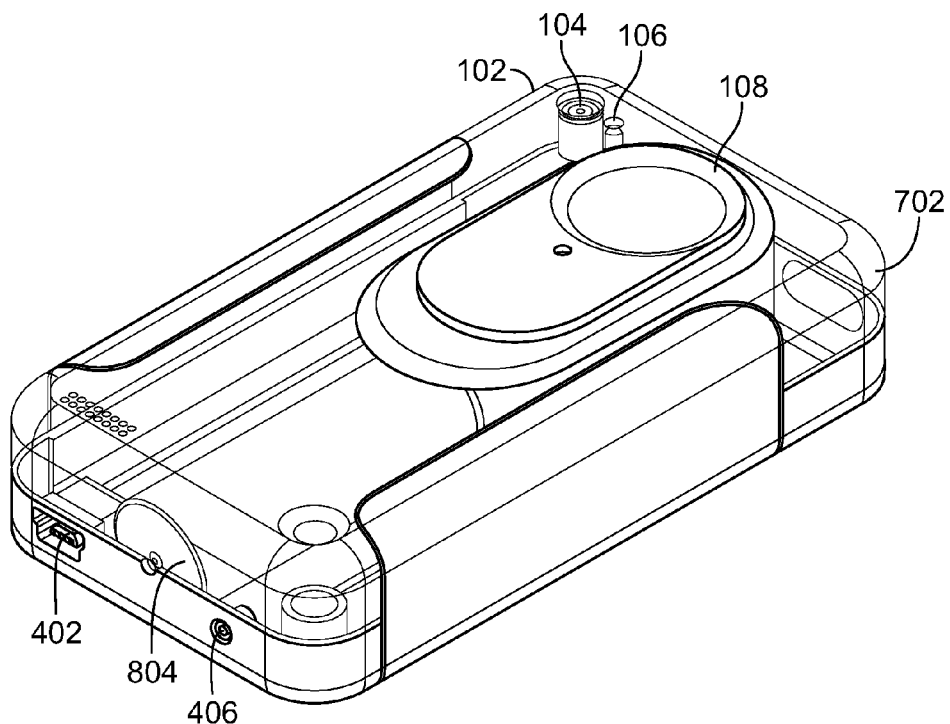
FIG. 8C illustrates a rear/bottom perspective view with a semi-transparent front enclosure for the example device as described with reference to FIGS. 1-7, in accordance with an embodiment of the present invention.

FIG. 8C illustrates a rear/bottom perspective view with a semi-transparent front enclosure for the example device as described with reference to FIGS. 1-7, in accordance with an embodiment of the present invention.

Front enclosure portion 702 is semi-transparent such that the internal components of device 100 may be viewed.

Device 100 includes components as described with reference to FIGS. 1-7 in addition to a battery compartment 804. Battery compartment 804 provides an enclosure for a battery (not shown). Camera 104, light sensor 106, and power supply input 406 are provided with additional visibility in FIG. 8C.

FIG. 8C illustrates a rear/bottom perspective view with a semi-transparent front enclosure for the example device as described with reference to FIGS. 1-7 where the internal structure of components are provided for viewing.

Figure 8D:
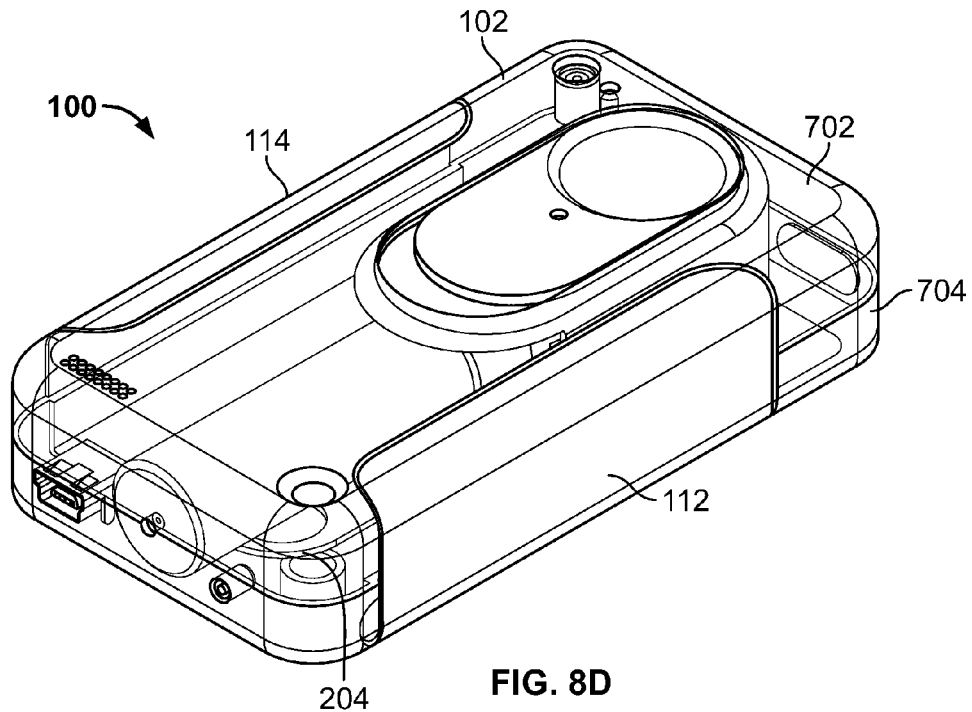
FIG. 8D illustrates a rear/bottom perspective view with a semi-transparent front and rear enclosure for the example device as described with reference to FIGS. 1-7, in accordance with an embodiment of the present invention.

FIG. 8D illustrates a rear/bottom perspective view with a semi-transparent front and rear enclosure for the example device as described with reference to FIGS. 1-7, in accordance with an embodiment of the present invention.

Front enclosure portion 702 and rear enclosure portion 704 are semi-transparent such that internal components of device 100 may be viewed.

From the view provided by FIG. 8D, hand grip 112, hand grip 114 and medical emergency selection 204 may be more clearly viewed.

FIG. 8D illustrates a rear/bottom perspective view with a semi-transparent front and rear enclosure for the example device as described with reference to FIGS. 1-7 where the internal details associated with a selection device and hand grips are more clearly visible.

Figure 8E:
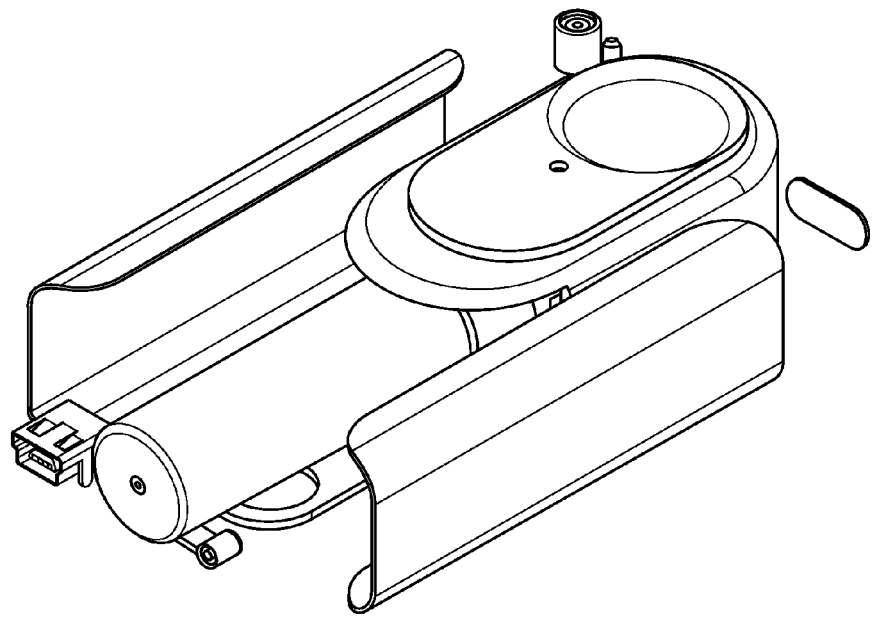
FIG. 8E illustrates a rear/bottom perspective view with a transparent front and rear enclosure for the example device as described with reference to FIGS. 1-7, in accordance with an embodiment of the present invention.

FIG. 8E illustrates a rear/bottom perspective view with a transparent front and rear enclosure for the example device as described with reference to FIGS. 1-7, in accordance with an embodiment of the present invention.

Front enclosure portion 702 and rear enclosure portion 704 are transparent such that internal components of device 100 may be viewed.

FIG. 8E illustrates a rear/bottom perspective view with a transparent front and rear enclosure for the example device as described with reference to FIGS. 1-7 providing additional internal details associated with components.

Figure 9:
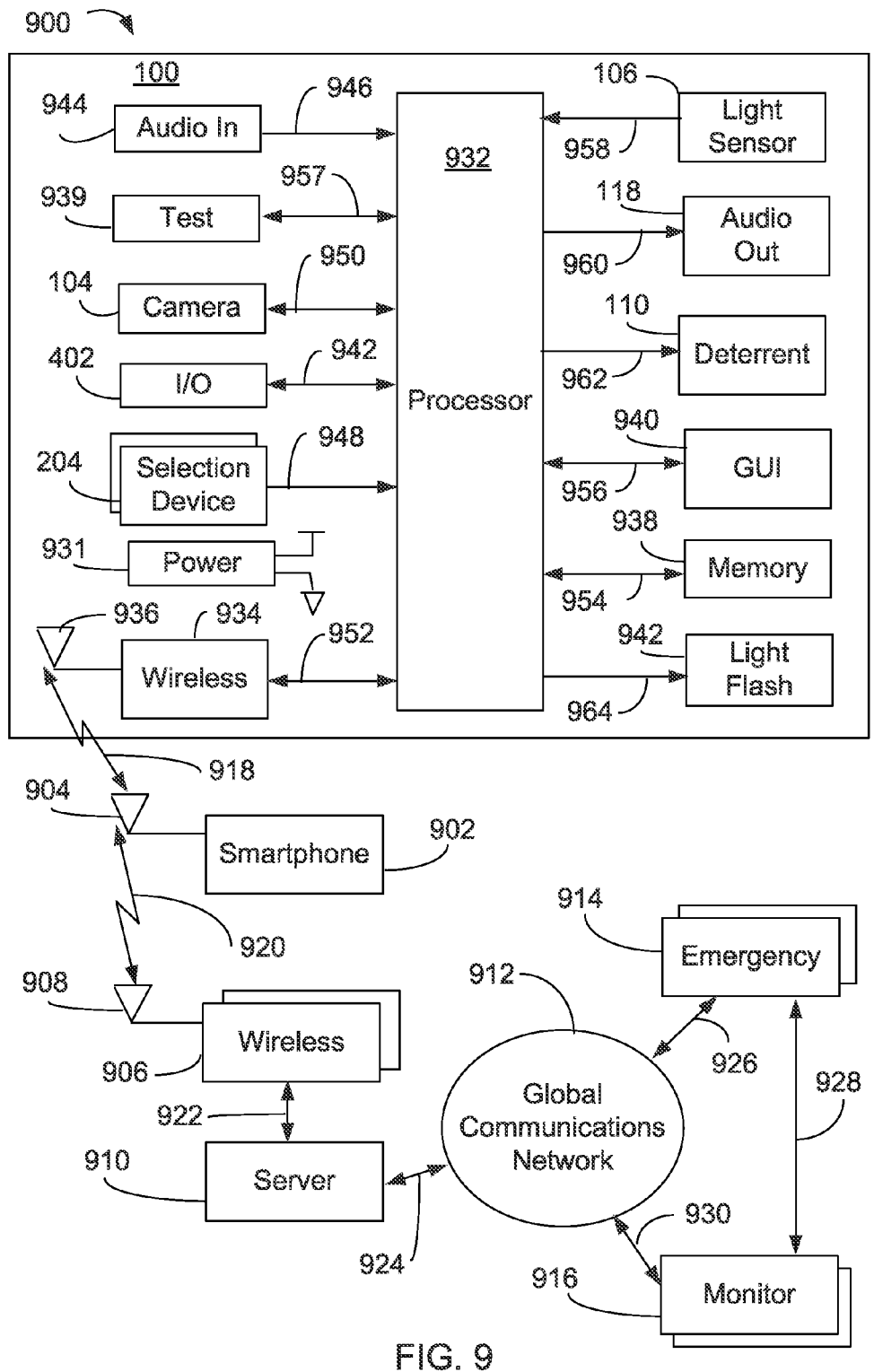
FIG. 9 illustrates a block diagram of the system and the example device as described with reference to FIGS. 1-8, in accordance with an embodiment of the present invention.

FIG. 9 illustrates a block diagram of the system and the example device as described with reference to FIGS. 1-8, in accordance with an embodiment of the present invention.

A system 900 provides capability for communicating images and/or video, position information and other information to emergency responders.

System 900 includes device 100 (as shown in FIGS. 1-8), a computing device 902, an antenna 904, a multiplicity of wireless transceivers with a sampling noted as a wireless transceiver portion 906, an antenna 908, a server 910, a global communications network 912, a multiplicity of emergency portions with a sampling noted as an emergency portion 914 and a multiplicity of monitor portions with a sampling noted as a monitor portion 916.

Device 100 communicates bi-directionally with computing device 902 via a communication channel 918. As a non-limiting example, communication channel 918 may be configured as wireless. Furthermore, communication via communication channel 918 may be performed via Bluetooth. Wireless transceiver portion 906 communicates bi-directionally with computing device 902 via a communication channel 920 and with server 910 via a communication channel 922. Global communications network 912 communicates bi-directionally with server 910 via a communication channel 924 with emergency portion 914 via a communication channel 926 and with monitor portion 916 via a communication channel 930. Computing device 902 communicates information bi-directionally via antenna 904. Wireless transceiver portion 906 communicates information bi-directionally via antenna 908. Monitor portion 916 communicates with emergency portion 914 via a communication channel 928. As a non-limiting example, communication channel 928 may be configured as a conventional telephone connection.

Computing device 902 receives, transmits, stores, retrieves, processes and presents information. As a non-limiting example, computing device 902 may be configured as a smartphone. Antenna 904 provides wireless reception and transmission of information. Wireless transceiver portion 906 receives and transmits information. Antenna 908 provides wireless reception and transmission of information. Server 910 receives, transmits, stores, retrieves and processes information. Global communications network 912 receives, transmits and routes information. Emergency portion 914 represents emergency responders receiving, transmitting, processing, presenting information and responding to received and processed information. Non-limiting examples of emergency responders include fire, police and ambulance. Monitor portion 916 receives, transmits, stores, retrieves, processes and presents information. Monitor portion 916 may receive information and perform assistance associated with verification and response of emergency responders.

Device 100 includes camera 104, light sensor 106, a multiplicity of selection devices with a sampling noted as medical emergency selection 204, deterrent facilitator 110, audio output portion 118, a power source portion 931, a processor portion 932, a wireless transceiver portion 934, an antenna portion 936, a memory portion 938 and a test portion 939. Selections devices may also be noted as lock/unlock selection 202 (as shown in FIG. 2) and in some embodiments deterrent initiator 108 (as shown in FIG. 1).

In some alternative embodiments device 100 may also include a GUI portion 940, a light flash portion 942 and an audio input portion 944.

Processor portion 932 receives information from audio input portion 944 via a communication channel 946 and from medical emergency selection 204 via a communication channel 948. Processor portion 932 communicates bi-directionally with camera 104 via a communication channel 950, with wireless transceiver portion 934 via a communication channel 952, with memory portion 938 via a communication channel 954, with GUI portion 940 via a communication channel 956 and with test portion 939 via a communication channel 957. Power indicator 106 receives information from processor portion 932 via a communication channel 958. Audio output portion 118 receives information from processor portion 932 via a communication channel 960. Deterrent facilitator 110 receives information from processor portion 932 via a communication channel 962. In some embodiments, deterrent facilitator 110 may be activated mechanically as opposed to a communication channel. Light flash portion 942 receives information from processor portion 932 via a communication channel 964. As a non-limiting example, light flash portion 942 may operate as a flash for camera 104. Wireless transceiver portion 934 communicates wireless information bi-directionally via antenna portion 936. In some embodiments, memory portion 938 and communication channel 954 may be located physically within processor portion 932.

Power source portion 931 provides capability for supplying power. As a non-limiting example, power source portion 931 may be configured as a battery. Processor portion 932 receives, transmits and processes information. As a non-limiting example, processor portion 932 may receive computer code instructions for performing operation of device 100. Test portion 939 provides capability for performing testing of device 100. As a non-limiting example, test portion 939 may be configured as IEEE 1149.1 (JTAG). GUI portion 940 receives, transmits and presents information for viewing. Light flash portion 942 provides a flash of light (e.g. for camera). Audio input portion 944 provides for reception and communication of audio information (e.g. microphone).

In operation, power is provided to device 100 via power source portion 931. Processor portion 932 receives instructional code information from memory portion 938 and stores/retrieves information via memory portion 938. Processor portion 932 communicates with computing device 902 via wireless transceiver portion 934, antenna portion 936, antenna 908 and communication channel 918. As a non-limiting example, processor portion 932 may retrieve geographic location information from computing device 902. Lock/unlock mode may be received by processor portion 932 from lock/unlock selection 202. If in lock mode, then operation of medical emergency selector 204 is disabled. If in unlock mode, then operation of medical emergency selection 204 is enabled. If medical emergency selection 204 is selected, then information is received and processed by processor portion 932. Furthermore, received information is transmitted to monitor portion 916 via computing device 902, wireless transceiver portion 906, server 910 and global communications network 912. Furthermore, monitor portion 916 may, receive, process and verify received information and communicate the received/processed information to emergency portion 914. Monitor may communicate information to emergency portion 914 via global communications network 912 and in some alternative embodiments via communication channel 928. In some optional embodiments, image/video information may be communicated directly to emergency portion 914 without first being received and processed by monitor portion 916. In some optional embodiments, audio information may be received by processor portion 932 from audio input portion 944 and communicated to monitor portion 916 and/or emergency portion 914. Selection of deterrent initiator 108 may be received and processed by processor portion 932, followed by processor portion 932 communicating information associated with the deployment of deterrent facilitator 110. Test information may be received by processor portion 932 from test portion 939. Furthermore, test information may be communicated to test portion 939 from processor portion 932. In some alternative embodiments, information may be presented and received via GUI portion 940. In some alternative embodiments, light flash portion 942 may be communicated to deploy following selection of deterrent initiator 108 such that image/video information received via camera 104 has increased illumination. In some alternative embodiments, information may be communicated from monitor portion 916 and/or emergency portion 914 to processor portion 932 for processing and communication via audio output portion 118 and/or GUI portion 940.

FIG. 9 illustrates a block diagram of the system and the example device as described with reference to FIGS. 1-8 where power is applied, application of power is indicated, processor received operational instructions, processor stores and retrieves information from memory, device communicates with external computing device via a wireless communication channel, device capabilities may be locked or unlocked, image/video information may be captured and communicated, image/video information may be communicated to a monitor and/or emergency portion, in some alternative embodiments audio information may be received and communicated to monitor or emergency portion, deterrent may be deployed, test information may be communicated, in some embodiments GUI may present and receive information and in some alternative embodiments a light flash may be deployed.

Figure 10:
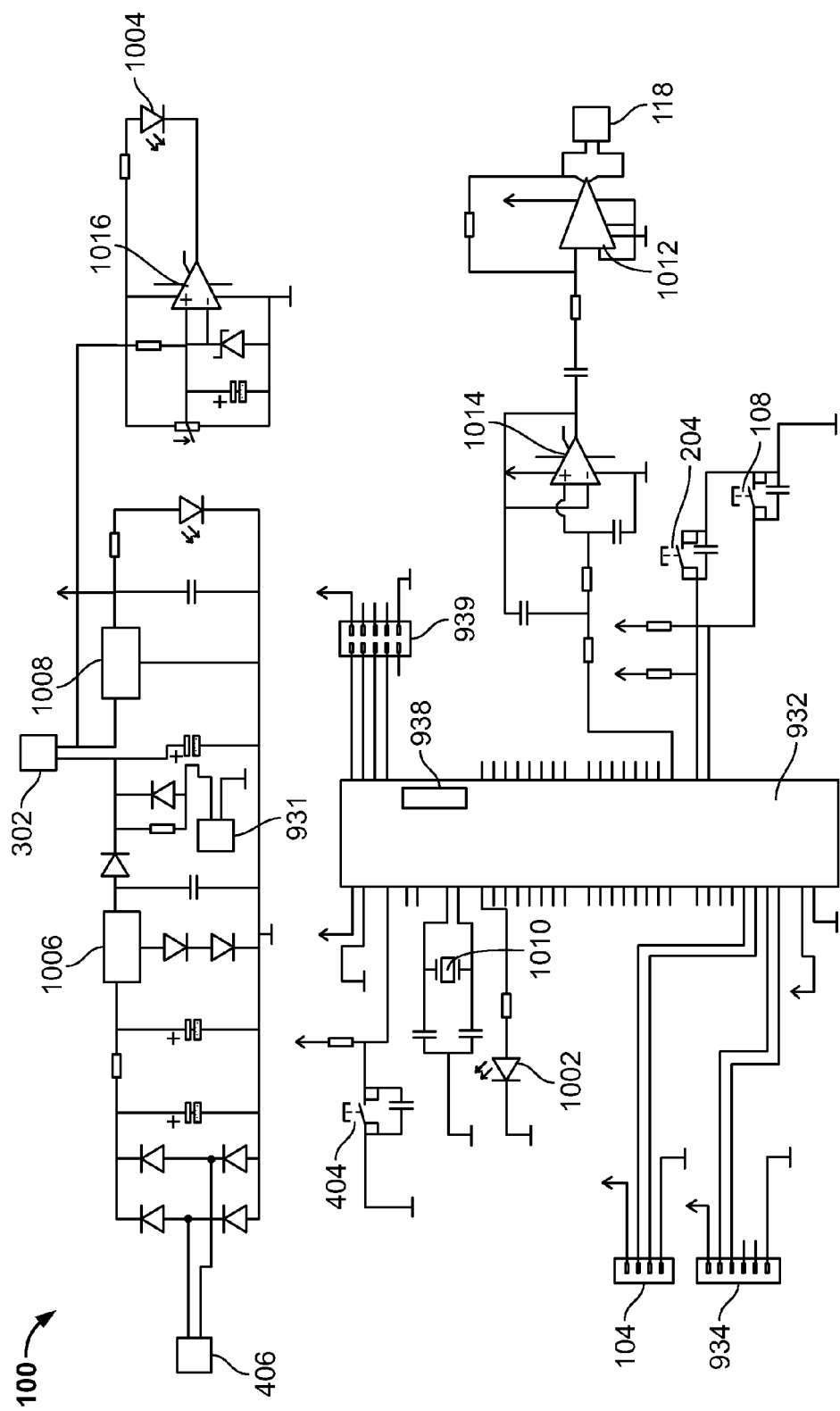
FIG. 10 illustrates a schematic diagram of the example device as described with reference to FIGS. 1-9, in accordance with an embodiment of the present invention.

FIG. 10 illustrates a schematic diagram of the example device as described with reference to FIGS. 1-9, in accordance with an embodiment of the present invention.

Device 100 includes camera 104, audio output portion 118, lock/unlock selection 202, medical emergency selection 204, deterrent initiator 108, on/off selection 302, reset selection 404, power supply input 406, power source portion 931, processor portion 932, memory portion 938, test portion 939, an indicator device 1002, a low voltage indicator 1004, a voltage regulator 1006, a voltage regulator 1008, a clock source 1010, an audio amplifier 1012, an operational amplifier 1014 and an operational amplifier 1016.

Indicator device 1002 provides an indicator for viewing. As a non-limiting example, indicator device 1002 may be configured as an LED. Low voltage indicator 1004 provides an indication for viewing associated with a low voltage condition. As a non-limiting example, low voltage indicator 1004 may be configured as an LED. Voltage regulator 1006 provides regulation associated with voltage in order to maintain a voltage within a certain range, typically about 12 V DC. In other embodiments, the voltage may be higher or lower.

Voltage regulator 1008 provides regulation associated with voltage in order to maintain a voltage with a certain range, typically about 5 V DC. In other embodiments, the voltage may be higher or lower. Clock source 1010 provides a clock signal for operation of device 100. As a non-limiting example, clock source 1010 may be configured as a 20 MHz oscillator. Audio amplifier 1012 provides audio amplification. As a non-limiting example, audio amplifier 1012 may be configured as an MC34119D. Operational amplifier 1014 provides for amplification of a signal. As a non-limiting example, operational amplifier 1014 is configured as a LM741D. Operational amplifier 1016 provides for amplification of a signal. As a non-limiting example, operational amplifier 1014 may be configured as a LM741D.

For this embodiment, memory portion 938 resides and operates internal to processor portion 932. As a non-limiting example, processor portion 932 may be configured as an MSP430F140.

Indicator device 1002 provides an indication associated with the operation of device 100. As a non-limiting example, indicator device 1002 provides for information associated with the operation of processor portion 932. Low voltage indicator 1004 provides an indication of a low voltage condition. As a non-limiting example, low voltage indicator 1004 may indicate power source portion 931 needs to be recharged. Voltage regulator 1006 provides a regulated voltage for recharging power source portion 931 when power is applied to power supply input 406. Voltage regulator 1008 provides regulated power for device 100. Clock source 1010 provides a clock source for processor portion 932. Audio amplifier 1012 provides a source of amplified audio for driving audio output portion 118. Operational amplifier 1014 provides for amplification of audio for driving audio amplifier 1012. Operational amplifier 1016 provides a signal for controlling the illumination/non-illumination of low voltage indicator 1004.

In operation, Clock source 1010 provides a clock source for driving processor portion 932. Furthermore, processor portion 932 may configured the illumination/non-illumination of indicator device 1002. As a non-limiting example, processor portion 932 may present diagnostic information such as a memory error. Low voltage indicator 1004 provides an indication of a low battery condition associated with power source portion 931. Voltage regulator 1006 provides for recharging power source portion 931 when an external power source is connected via power supply input 406. Voltage regulator 1008 provides power for operation of device 100 when on/off selection 302 is configured for "on" and does not provide power when on/off selection 302 is configured for "off". Furthermore, voltage regulator 1008 provides for illumination of power indicator when on/off selection 302 is configured for "on" and for non-illumination when on/off selection 302 is configured for "off". Audio amplifier 1012 provides amplified audio information for driving audio output portion 118. Operational amplifier 1014 provides for amplification of an audio signal to be provided to audio amplifier 1012. Operational amplifier 1016 provides an amplified signal for controlling the operation of low voltage indicator 1004. Power source portion 931 provides power to voltage regulator 1008 when on/off selection 302 is configured for "on" and does not provide power when on/off selection 302 is configured for "off". Reset selection 404 provides for reset of processor portion 932 when selected. Test portion 939 provides for testing processor portion 932 when configured for a condition of test. Memory portion 938 provides for storage and retrieval of information. As a non-limiting example, memory portion 938 may be configured as Flash and/or DRAM/RAM. Processor portion 932 receives image information from camera 104. Processor portion 932 receives wireless information via wireless transceiver portion 934. As a non-limiting example, wireless transceiver portion 934 may be configured as Bluetooth. Processor portion 932 receives lock/unlock information from lock/unlock selection 202. Processor portion 932 receives selection information from medical emergency selection 204 associated with communicating information. Processor portion 932 receives selection information from deterrent initiator 108 associated with capturing images/video, communicating images/video and broadcasting audio.

FIG. 10 illustrates a schematic diagram of the example device as described with reference to FIGS. 1-9 where indicators are provided for viewing information, a low voltage indicator is provided for presenting a condition of low voltage, voltage regulation is provided for charging a battery, voltage regulation is provided for power device 100, a clock source is provided for operation of device 100, audio amplifiers are provides for presenting audio information and amplification is provided for driving a low voltage indicator.

Figure 11A:
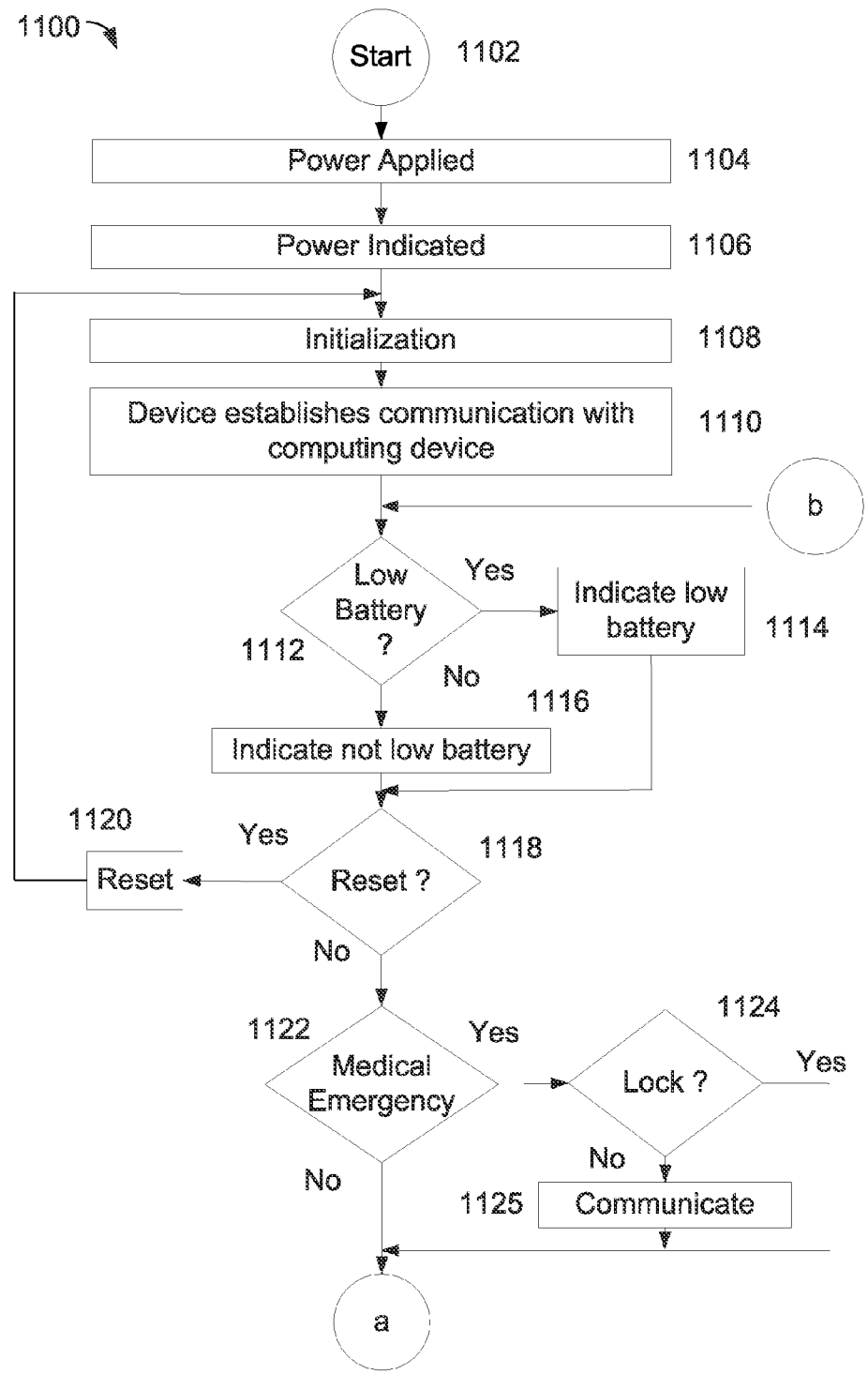
FIGS. 11A-B illustrates an example method for operation of the device and system as described with reference to FIGS. 1-10, in accordance with an embodiment of the present invention.
Figure 11B:
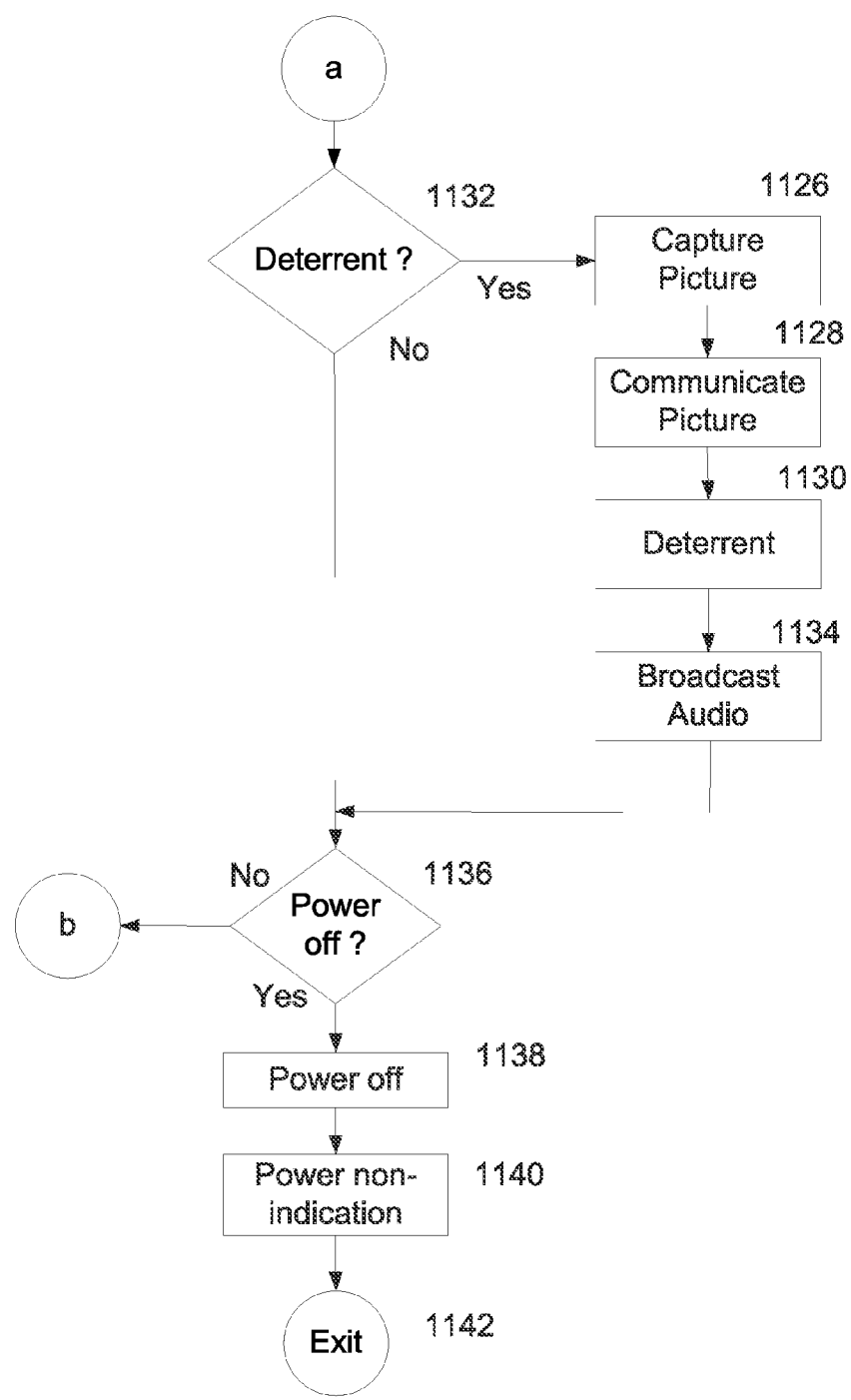

FIGS. 11A-B illustrates an example method for operation of the device and system as described with reference to FIGS. 1-10, in accordance with an embodiment of the present invention.

FIGS. 11A-B presents a method 1100 with a process initiating in a step 1102.

Referring to FIG. 11A, then in a step 1104, power is applied to the device.

As a non-limiting example, on/off selection 302 (as shown in FIG. 3) is configured for the "on" condition which allows power to be supplied to voltage regulator 1008 (as shown in FIG. 10) from power source portion 931 (as shown in FIG. 9). Furthermore, power is supplied to device 100 (as shown in FIG. 1) via voltage regulator 1008 (as shown in FIG. 10).

Referring to FIG. 11A, then in a step 1106, an indication of power is presented.

Referring to FIG. 11A, then in a step 1108 initialization of device is performed.

As a non-limiting example, processor portion 932 (as shown in FIG. 9) receives instructional codes from memory portion 938 (as shown in FIG. 9). Furthermore, processor portion 932 (as shown in FIG. 9) determines the condition of lock/unlock selection 202 (as shown in FIG. 2), deterrent initiator 108 (as shown in FIG. 2), and medical emergency selection 204 (as shown in FIG. 2). Furthermore, processor portion 932 (as shown in FIG. 9) configures camera 104 (as shown in FIG. 1), wireless transceiver portion 934 (as shown in FIG. 9) and indicator device 1002 (as shown in FIG. 10). Furthermore, processor determines condition associated with test via test portion 939 (as shown in FIG. 9). Furthermore, if power is applied to power supply input 406 (as shown in FIG. 4), then voltage regulator 1006 (as shown in FIG. 10) recharges power source portion 931 (as shown in FIG. 9).

Referring to FIG. 11A, then in a step 1110 device establishes communication with computing device.

As a non-limiting example, device 100 (as shown in FIG. 1) establishes communication with computing device 902 (as shown in FIG. 9). Furthermore, processor portion 932 (as shown in FIG. 9) communicates with computing device via wireless transceiver portion 934 (as shown in FIG. 9). As a non-limiting example, computing device 902 (as shown in FIG. 9) may perform authorization processing with device 100 (as shown in FIG. 1).

Referring to FIG. 11A, then in a step 1112, a determination for a low battery condition is performed.

As a non-limiting example, if a low battery condition associated with power source portion 931 (as shown in FIG. 9) may be detected by operational amplifier 1016 (as shown in FIG. 10).

Referring to FIG. 11A, for a determination of a low battery condition in step 1112, then in a step 1114 a low battery condition is presented.

As a non-limiting example, if a low battery condition associated with power source portion 931 (as shown in FIG. 9) is detected by operational amplifier 1016 (as shown in FIG. 10) an indication of low battery is driven by operational amplifier 1016 (as shown in FIG. 10) and presented via low voltage indicator 1004 (as shown in FIG. 10).

Referring to FIG. 11A, for a determination of not a low battery condition in step 1112, then in a step 1116 a condition of low battery is not presented.

As a non-limiting example, if a low battery condition associated with power source portion 931 (as shown in FIG. 9) is not detected by operational amplifier 1016 (as shown in FIG. 10) then an indication of not low battery is driven by operational amplifier 1016 (as shown in FIG. 10) and presented via low voltage indicator 1004 (as shown in FIG. 10).

Referring to FIG. 11A, then in a step 1118, optionally, a determination for a reset condition is performed.

As a non-limiting example, a reset condition may be detected by reset selection 404 (as shown in FIG. 4).

Referring to FIG. 11A, for a determination of a reset condition in step 1118, then in a step 1120 a reset is performed followed by transitioning to step 1108.

As a non-limiting example, optionally, a reset condition is detected by reset selection 404 and communicated to processor portion 932 (as shown in FIG. 9) which performs reset processing.

Referring to FIG. 11A, for a determination of not a reset condition in step 1118, then in a step 1122 a determination for a medical emergency is performed.

As a non-limiting example, processor portion 932 (as shown in FIG. 9) may determine the selection associated with medical emergency selection 204 (as shown in FIG. 2).

Referring to FIG. 11A, for a determination of medical emergency in step 1122, then in a step 1124 a determination for a lock condition is performed.

As a non-limiting example, for a condition of lock, processing associated with medical emergency selection 204 is disabled, then in step 1132, as shown in FIG. 11B, a determination for a deterrent is performed.

Referring to FIG. 11A, for a determination of not a lock condition (e.g unlock) in step 1124, then in a step 1125, as shown in FIG. 11B, information is communicated from device to computing device.

Referring to FIG. 11A, for a determination of not a medical emergency in step 1122, then in step 1132, as shown in FIG. 11B, a determination for a deterrent is performed.

As a non-limiting example, processor portion 932 (as shown in FIG. 9) may determine a condition for picture processing via deterrent initiator 108 (as shown in FIG. 2).

Referring to FIG. 11B, for a determination of deterrent initiator in step 1132, then in step 1126 picture information is captured.

As a non-limiting example, if processor portion 932 (as shown in FIG. 9) determines a condition of deterrent selection for deterrent initiator selection 108 (as shown in FIG. 2), then image/video information may be receive by processor portion 932 (as shown in FIG. 9) from camera 104 (as shown in FIG. 1).

Referring to FIG. 11B, then in a step 1128 picture information is communicated from device to computing device.

As a non-limiting example, processor portion 932 (as shown in FIG. 9) communicates image/video information received from camera 104 (as shown in FIG. 1) to computing device 902 (as shown in FIG. 9) via wireless transceiver portion 934 (as shown in FIG. 9). Furthermore, computing device communicates image/video information to monitor portion 916 (as shown in FIG. 9) via wireless transceiver portion 906 (as shown in FIG. 9), server 910 (as shown in FIG. 9) and global communications network 912 (as shown in FIG. 9). Furthermore, computing device may communicate image/video information to emergency portion 914 (as shown in FIG. 9). Furthermore, monitor portion 916 (as shown in FIG. 9) may communicate image/video information to emergency portion 914 (as shown in FIG. 9).

Referring to FIG. 11B, following step 1128, then in a step 1130 initiation of deterrent is performed.

As a non-limiting example, deterrent initiator 108 (as shown in FIG. 1) may mechanically initiate deterrent facilitator 110 (as shown in FIG. 1). In some embodiments, deterrent initiator 108 (as shown in FIG. 1) condition may be received and processed by processor portion 932 (as shown in FIG. 9) followed by initiation of deterrent facilitator 110 (as shown in FIG. 1) via processor portion 932 (as shown in FIG. 9). In some embodiments, deployment of deterrent may follow broadcast of audio as described with reference to step 1134.

Referring to FIG. 11B, then in a step 1134 audio information is broadcast.

As a non-limiting example, processor portion 932 (as shown in FIG. 9) communicates audio information to operational amplifier 1014 (as shown in FIG. 10). Furthermore, operational amplifier 1014 (as shown in FIG. 10) communicates amplified audio information to audio amplifier 1012 (as shown in FIG. 10). Furthermore, audio amplifier 1012 (as shown in FIG. 10) communicates the amplified audio information to audio output portion 118 (as shown in FIG. 1).

Referring to FIG. 11B, following broadcast audio in step 1134, a determination is performed for power removal.

As a non-limiting example, the condition for power removal may be determined via on/off selection 302 (as shown in FIG. 3).

Referring to FIG. 11B, for a determination of not removing power in step 1136, execution of method 1100 transitions to step 1112 as shown in FIG. 1A.

Referring to FIG. 11B, for a determination of removing power in step 1136, then in a step 1138 power is removed from device.

As a non-limiting example, if on/off selection 302 (as shown in FIG. 3) is configured for "off", then power is removed from voltage regulator 1008 (as shown in FIG. 10). Furthermore, voltage regulator 1008 (as shown in FIG. 10) removes power from device 100 (as shown in FIG. 1).

Referring to FIG. 11B, then in a step 1140 indication of power is removed.

As a non-limiting example, removal of power from voltage regulator 1008 (as shown in FIG. 10) is communicated via power indicator 106 (as shown in FIG. 1).

Referring to FIG. 11B, then in a step 1142 execution of method 1100 terminates.

FIGS. 11A-B illustrates an example method for operation of the device and system as described with reference to FIGS. 1-10 where power is applied, an indication of power is presented, initialization is performed, device establishes communication with computing device, low battery processing and indication is performed, reset processing is performed, medical emergency processing is performed, lock/unlock processing is performed, picture information is captured and communicated, deterrent processing is performed, audio information is broadcast, power is removed and power non-indication is performed.

Figure 12:
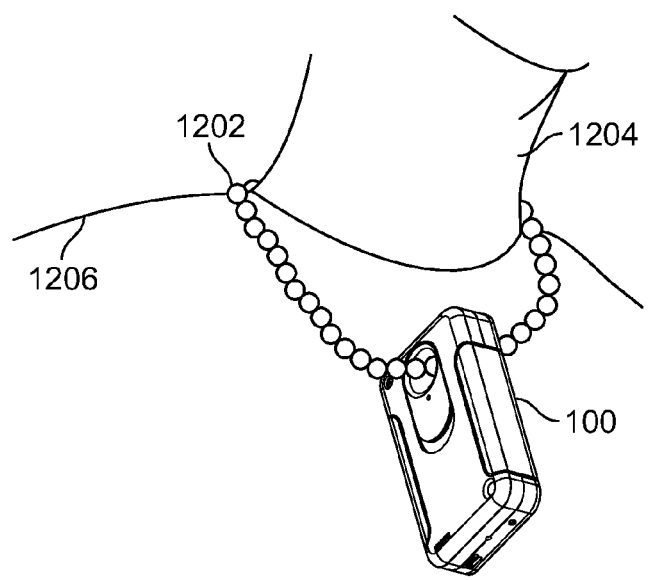
FIG. 12 illustrates the device as described with reference to FIGS. 1-11 configured for operation via a necklace, in accordance with an alternative embodiment of the present invention.

FIG. 12 illustrates the device as described with reference to FIGS. 1-11 configured for operation via a necklace, in accordance with an alternative embodiment of the present invention.

Device 100 is attached to a necklace 1202. Necklace 1202 resides about a neck 1204 of a person 1206.

Device 100 is securely attached to person via a necklace such that when person needs to operate device 100, the device is readily available.

FIG. 12 illustrates the device as described with reference to FIGS. 1-11 configured for operation via a necklace such that the device is available when needed.

Figure 13:
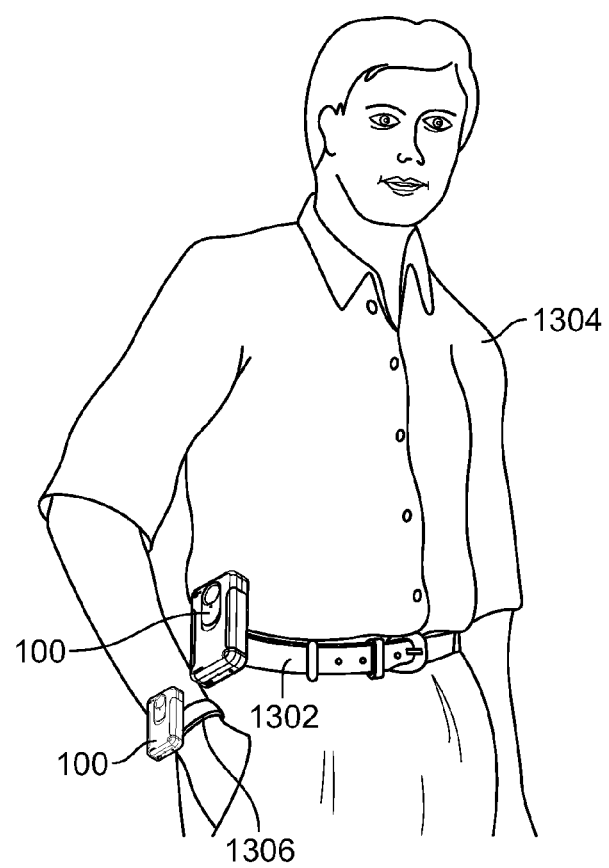
FIG. 13 illustrates the device as described with reference to FIGS. 1-11 configured for operation via a belt and/or a watch, in accordance with an alternative embodiment of the present invention.

FIG. 13 illustrates the device as described with reference to FIGS. 1-11 configured for operation via a belt and/or a watch, in accordance with an alternative embodiment of the present invention.

Device 100 is attached to a belt 1302 associated with a person 1304. Belt 1302 resides about the waist of person 1304.

Additionally, device 100 is attached to a wrist strap 1306. Wrist strap 1306 resides about the wrist of person 1304.

Device 100 is securely attached to person via a belt and/or a wrist strap such that when person needs to operate device 100, the device is readily available.

FIG. 13 illustrates the device as described with reference to FIGS. 1-11 configured for operation via a belt and/or a watch where the device is readily available for operation.

In other embodiments (not shown), device 100 may be attached to a key chain or may be attached via Velcro to holder attached to a bicep of a user.

Devices and systems have been described which provide means and methods for providing wireless self-defense/emergency response capabilities. Furthermore, device may communicate wirelessly (e.g. Bluetooth) with a computing device (e.g. smartphone) for communicating information to the monitoring system and/or emergency authorities (e.g. police, fire, ambulance, etc.) in order to notify the monitor system and/or emergency authorities of an emergency situation. Furthermore, monitoring system may communicate information received from device to emergency authorities. As a non-limiting example, a picture or image may be captured of an assailant or potential assailant for communication to emergency authorities. As a non-limiting example, picture/image information may be communicated via a text message and/or an email message from computing device (e.g. smartphone). Furthermore, picture/image information may be communicated via Short Message Service (SMS) and/or Microsoft Media Server (MMS). Furthermore, geographic location information (e.g. Global Positioning System (GPS)) may be communicated from computing device to monitoring system and/or emergency authorities. Furthermore, picture/image information may be communicated to a predetermined list of contacts associated with user (e.g. family, etc.). Furthermore, text information may be communicated from device to monitoring service and/or emergency authorities related to the need for possible assistance. Device may deploy a deterrent (e.g. pepper spray, mace, taser, etc.) when selected by user. Device may operate to broadcast an audio message informing an assailant or a possible assailant that his/her image/picture has been captured and communicated to emergency authorities. Furthermore, device may operate to broadcast an audible alarm in order to deter an assailant or possible assailant and to notify other persons in the vicinity of the device. Furthermore, broadcast audio information and audible alarm may be rebroadcast at a periodic interval. Device may also operate to notify medical personal of a medical emergency. As a non-limiting example, a different selection device may be made available for performing notification associated with medical emergencies. Furthermore, a text message of email message may be communicated to medial emergency personnel informing them of the medical emergency. Furthermore, geographic location information may be communicated to emergency personnel. Furthermore, picture/image information may also be communicated in a medical emergency situation. Furthermore, additional information associated with user may be communicated (e.g. medical condition, age, gender, address, etc.). Monitoring system may operate to support receiving and processing information from device and computing device 24 hours a day and seven days a week. As a non-limiting example, deterrent may be deployed via a spraying mechanism. Furthermore, information from device may be communicated to computing devices (e.g. smartphone) associated with emergency authorities (e.g. law enforcement, medical personnel, etc.).

As a non-limiting example, device may used by security personal, for self-defense, for personal protection, by women, by individuals with medical issues that cannot dial 911 and those in high crime high risk environments, by application developers, by women's groups and by emergency alert/assistance services.

In some embodiments, as non-limiting examples, communication between device and monitoring system and/or emergency authorities may be performed via conventional landline telephone.

In some embodiments, as non-limiting examples, deterrent may be configured to use onion juice and lemon, Wasabi and/or variations of pepper spray.

In some embodiments, as non-limiting examples, camera may communicate a variety of image sizes, zoom configurations and quality. Furthermore, camera may communicate a variety of video configurations (e.g. size, zoom, quality, shutter, etc.).

In some embodiments, as non-limiting examples, device may be attached via a hook and loop mechanism or any other known fastening mechanism.

In some embodiments, spray canister associated with deterrent may be replaced via a door or cover which may be removed for providing access.

In some alternative embodiments, device may incorporate GPS capability for communicating location information to computing device in order to be forwarded to monitoring service and/or emergency authorities.

In some alternative embodiments, device may be attached to a firearm, stun gun or taser.

In some alternative embodiments, device may be attached to and operate from an automobile.

In some alternative embodiments, device may be configured for operation in an access way such as a door or a window.

In some alternative embodiments, initiation of image capture/communication and deployment of deterrent may be automatically triggered via a triggering mechanism (e.g. opening a door, window, etc.).

In some alternative embodiment, initiation of image capture/communication and deployment of deterrent may be deployed via reception of an audio or audible verbal command (e.g. deploy deterrent, etc.)

In some alternative embodiments, system does not provide varying levels of response to user such as a choice of alerting first responders to go to the scene, sending security personnel to the scene, remotely monitoring the scene, remotely interacting with the scene and providing information/advice to the user.

In some alternative embodiments, system does not provide capability for searching for a nearest 911 operator and providing connection to the nearest 911 operator. Furthermore, system does not operate as a backup for 911 systems by recording both speech and text.

In some alternative embodiments, system does not transmit an indication of the emergency situation to a communication network control system, where the communication network controls system confirms the indication of the emergency situation which further communicates an indication of the emergency situation to one or more additional mobile devices in the area.

Some embodiments may not include emergency aspects of the device.

Some embodiments may include other or additional deterrents.

In some embodiments, aspects of the device may be combined with a smartphone, such as, but not limited to, an outer shell for a smartphone.

In some embodiments, appropriate sensors for a variety of medical issues ranging from, but not limited to, epilepsy, heart problems, respiratory ailments, diabetes, seizures, severe allergies, emphysema etc. could communicate with an emergency response monitoring system thru the use of a smartphone.

In some embodiments, law enforcement may use the system of communication to place convicted criminals under house arrest or restricting their movement using an API interface and a variety of sensors and GPS activated by preset metrics.

In some embodiments, parents wanting to monitor their children's safety could do so by applying an API interface that monitored GPS coordinates and other metrics by using a variety of sensors. These devices may also act as an emergency beacon in the case of abduction or a lost child. Combined with the emergency response application this may act as a useful apparatus for parenting.

In some embodiments, the system may be used in conjunction with current landline alert systems or as a replacement.

Figure 14:
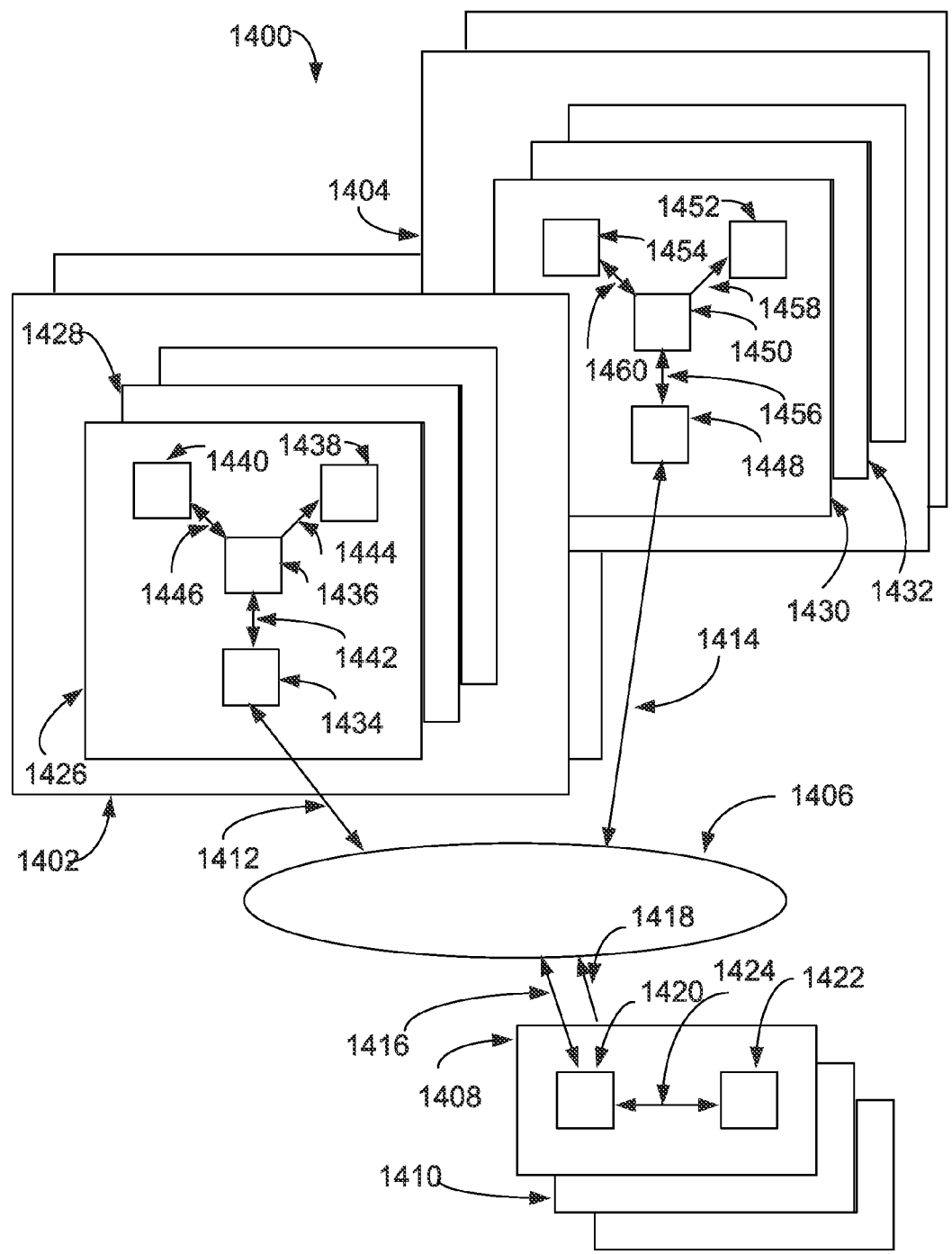
FIG. 14 illustrates a block diagram depicting a conventional client/server communication system.

FIG. 14 illustrates a block diagram depicting a conventional client/server communication system.

A communication system 1400 includes a multiplicity of networked regions with a sampling of regions denoted as a network region 1402 and a network region 1404, a global network 1406 and a multiplicity of servers with a sampling of servers denoted as a server device 1408 and a server device 1410.

Network region 1402 and network region 1404 may operate to represent a network contained within a geographical area or region. Non-limiting examples of representations for the geographical areas for the networked regions may include postal zip codes, telephone area codes, states, counties, cities and countries. Elements within network region 1402 and 1404 may operate to communicate with external elements within other networked regions or within elements contained within the same network region.

In some implementations, global network 1406 may operate as the Internet. It will be understood by those skilled in the art that communication system 1400 may take many different forms. Non-limiting examples of forms for communication system 1400 include local area networks (LANs), wide area networks (WANs), wired telephone networks, cellular telephone networks or any other network supporting data communication between respective entities via hardwired or wireless communication networks. Global network 1406 may operate to transfer information between the various networked elements.

Server device 1408 and server device 1410 may operate to execute software instructions, store information, support database operations and communicate with other networked elements. Non-limiting examples of software and scripting languages which may be executed on server device 1408 and server device 1410 include C, C++, C# and Java.

Network region 1402 may operate to communicate bi-directionally with global network 1406 via a communication channel 1412. Network region 1404 may operate to communicate bi-directionally with global network 1406 via a communication channel 1414. Server device 1408 may operate to communicate bi-directionally with global network 1406 via a communication channel 1416. Server device 1410 may operate to communicate bi-directionally with global network 1406 via a communication channel 1418. Network region 1402 and 1404, global network 1406 and server devices 1408 and 1410 may operate to communicate bi-directionally and also communicate bi-directionally with other networked device located within communication system 1400.

Server device 1408 includes a networking device 1420 and a server 1422. Networking device 1420 may operate to communicate bi-directionally with global network 1406 via communication channel 1416 and with server 1422 via a communication channel 1424. Server 1422 may operate to execute software instructions and store information.

Network region 1402 includes a multiplicity of clients with a sampling denoted as a client 1426 and a client 1428. Client 1426 includes a networking device 1434, a processor 1436, a GUI 1438 and an interface device 1440. Non-limiting examples of devices for GUI 1438 include monitors, televisions, cellular telephones, smartphones and PDAs (Personal Digital Assistants). Non-limiting examples of interface device 1440 include pointing device, mouse, trackball, scanner and printer. Networking device 1434 may communicate bi-directionally with global network 1406 via communication channel 1412 and with processor 1436 via a communication channel 1442. GUI 1438 may receive information from processor 1436 via a communication channel 1444 for presentation to a user for viewing. Interface device 1440 may operate to send control information to processor 1436 and to receive information from processor 1436 via a communication channel 1446. Network region 1404 includes a multiplicity of clients with a sampling denoted as a client 1430 and a client 1432. Client 1430 includes a networking device 1448, a processor 1450, a GUI 1452 and an interface device 1454. Non-limiting examples of devices for GUI 1438 include monitors, televisions, cellular telephones, smartphones and PDAs (Personal Digital Assistants). Non-limiting examples of interface device 1440 include pointing devices, mousse, trackballs, scanners and printers. Networking device 1448 may communicate bi-directionally with global network 1406 via communication channel 1414 and with processor 1450 via a communication channel 1456. GUI 1452 may receive information from processor 1450 via a communication channel 1458 for presentation to a user for viewing. Interface device 1454 may operate to send control information to processor 1450 and to receive information from processor 1450 via a communication channel 1460.

For example, consider the case where a user interfacing with client 1426 may want to execute a networked application. A user may enter the IP (Internet Protocol) address for the networked application using interface device 1440. The IP address information may be communicated to processor 1436 via communication channel 1446. Processor 1436 may then communicate the IP address information to networking device 1434 via communication channel 1442. Networking device 1434 may then communicate the IP address information to global network 1406 via communication channel 1412. Global network 1406 may then communicate the IP address information to networking device 1420 of server device 1408 via communication channel 1416. Networking device 1420 may then communicate the IP address information to server 1422 via communication channel 1424. Server 1422 may receive the IP address information and after processing the IP address information may communicate return information to networking device 1420 via communication channel 1424. Networking device 1420 may communicate the return information to global network 1406 via communication channel 1416. Global network 1406 may communicate the return information to networking device 1434 via communication channel 1412. Networking device 1434 may communicate the return information to processor 1436 via communication channel 1442. Processor 1436 may communicate the return information to GUI 1438 via communication channel 1444. User may then view the return information on GUI 1438.

Figure 15:
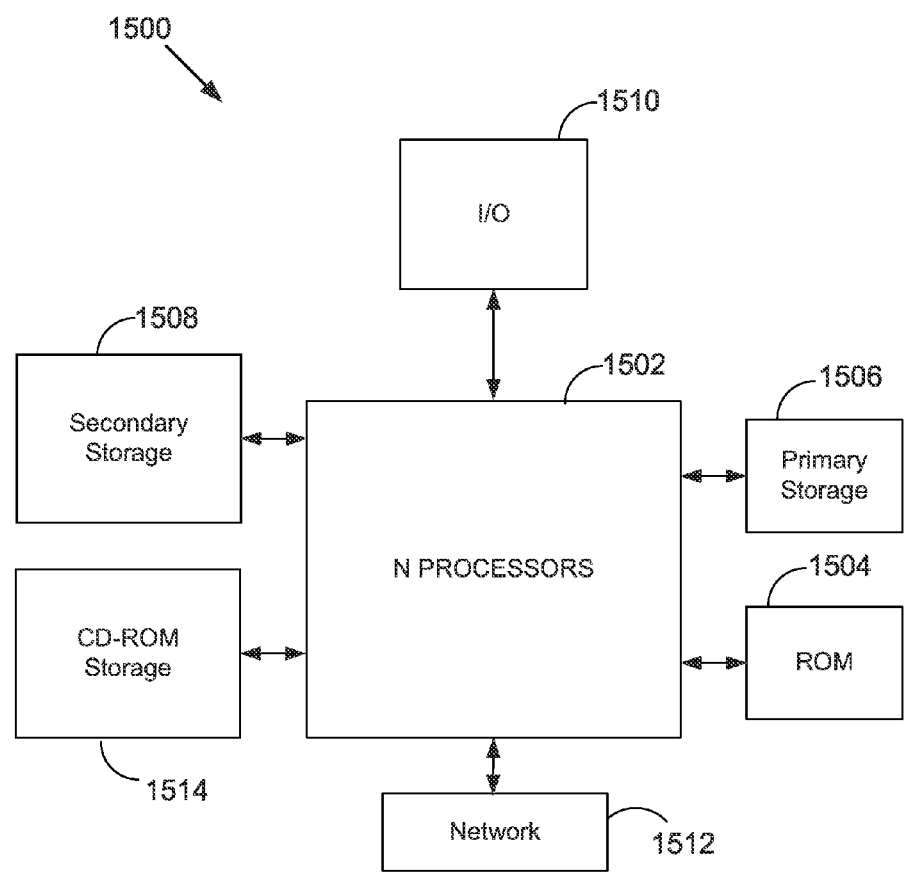
FIG. 15 illustrates a typical computer system that, when appropriately configured or designed, may serve as a computer system for which the present invention may be embodied.

FIG. 15 illustrates a typical computer system that, when appropriately configured or designed, may serve as a computer system 1500 for which the present invention may be embodied.

Computer system 1500 includes a quantity of processors 1502 (also referred to as central processing units, or CPUs) that may be coupled to storage devices including a primary storage 1506 (typically a random access memory, or RAM), a primary storage 1504 (typically a read-only memory, or ROM). CPU 1502 may be of various types including microcontrollers (e.g., with embedded RAM/ROM) and microprocessors such as programmable devices (e.g., RISC or SISC based, or CPLDs and FPGAs) and devices not capable of being programmed such as gate array ASICs (Application Specific Integrated Circuits) or general purpose microprocessors. As is well known in the art, primary storage 1504 acts to transfer data and instructions uni-directionally to the CPU and primary storage 1506 typically may be used to transfer data and instructions in a bi-directional manner. The primary storage devices discussed previously may include any suitable computer-readable media such as those described above. A mass storage device 1508 may also be coupled bi-directionally to CPU 1502 and provides additional data storage capacity and may include any of the computer-readable media described above. Mass storage device 1508 may be used to store programs, data and the like and typically may be used as a secondary storage medium such as a hard disk. It will be appreciated that the information retained within mass storage device 1508, may, in appropriate cases, be incorporated in standard fashion as part of primary storage 1506 as virtual memory. A specific mass storage device such as a CD-ROM 1514 may also pass data uni-directionally to the CPU.

CPU 1502 may also be coupled to an interface 1510 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1502 optionally may be coupled to an external device such as a database or a computer or telecommunications or internet network using an external connection shown generally as a network 1512, which may be implemented as a hardwired or wireless communications link using suitable conventional technologies. With such a connection, the CPU might receive information from the network, or might output information to the network in the course of performing the method steps described in the teachings of the present invention.

Those skilled in the art will readily recognize, in light of and in accordance with the teachings of the present invention, that any of the foregoing steps and/or system modules may be suitably replaced, reordered, removed and additional steps and/or system modules may be inserted depending upon the needs of the particular application, and that the systems of the foregoing embodiments may be implemented using any of a wide variety of suitable processes and system modules, and is not limited to any particular computer hardware, software, middleware, firmware, microcode and the like. For any method steps described in the present application that can be carried out on a computing machine, a typical computer system can, when appropriately configured or designed, serve as a computer system in which those aspects of the invention may be embodied.

It will be further apparent to those skilled in the art that at least a portion of the novel method steps and/or system components of the present invention may be practiced and/or located in location(s) possibly outside the jurisdiction of the United States of America (USA), whereby it will be accordingly readily recognized that at least a subset of the novel method steps and/or system components in the foregoing embodiments must be practiced within the jurisdiction of the USA for the benefit of an entity therein or to achieve an object of the present invention. Thus, some alternate embodiments of the present invention may be configured to comprise a smaller subset of the foregoing means for and/or steps described that the applications designer will selectively decide, depending upon the practical considerations of the particular implementation, to carry out and/or locate within the jurisdiction of the USA. For example, any of the foregoing described method steps and/or system components which may be performed remotely over a network (e.g., without limitation, a remotely located server) may be performed and/or located outside of the jurisdiction of the USA while the remaining method steps and/or system components (e.g., without limitation, a locally located client) of the forgoing embodiments are typically required to be located/performed in the USA for practical considerations. In client-server architectures, a remotely located server typically generates and transmits required information to a US based client, for use according to the teachings of the present invention. Depending upon the needs of the particular application, it will be readily apparent to those skilled in the art, in light of the teachings of the present invention, which aspects of the present invention can or should be located locally and which can or should be located remotely. Thus, for any claims construction of the following claim limitations that are construed under 35 USC §112 (6) it is intended that the corresponding means for and/or steps for carrying out the claimed function are the ones that are locally implemented within the jurisdiction of the USA, while the remaining aspect(s) performed or located remotely outside the USA are not intended to be construed under 35 USC §112 (6). In some embodiments, the methods and/or system components which may be located and/or performed remotely include, without limitation: servers and global communication network.

It is noted that according to USA law, all claims must be set forth as a coherent, cooperating set of limitations that work in functional combination to achieve a useful result as a whole. Accordingly, for any claim having functional limitations interpreted under 35 USC §112 (6) where the embodiment in question is implemented as a client-server system with a remote server located outside of the USA, each such recited function is intended to mean the function of combining, in a logical manner, the information of that claim limitation with at least one other limitation of the claim. For example, in client-server systems where certain information claimed under 35 USC §112 (6) is/(are) dependent on one or more remote servers located outside the USA, it is intended that each such recited function under 35 USC §112 (6) is to be interpreted as the function of the local system receiving the remotely generated information required by a locally implemented claim limitation, wherein the structures and or steps which enable, and breath life into the expression of such functions claimed under 35 USC §112 (6) are the corresponding steps and/or means located within the jurisdiction of the USA that receive and deliver that information to the client (e.g., without limitation, client-side processing and transmission networks in the USA). When this application is prosecuted or patented under a jurisdiction other than the USA, then "USA" in the foregoing should be replaced with the pertinent country or countries or legal organization(s) having enforceable patent infringement jurisdiction over the present application, and "35 USC §112 (6)" should be replaced with the closest corresponding statute in the patent laws of such pertinent country or countries or legal organization(s).

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the present invention, other equivalent or alternative methods of devices and systems according to the present invention will be apparent to those skilled in the art. The invention has been described above by way of illustration, and the specific embodiments disclosed are not intended to limit the invention to the particular forms disclosed. For example, the particular implementation of the enclosure may vary depending upon the particular type deterrent used. The deterrents described in the foregoing were directed to spray implementations; however, similar techniques using non-spray (e.g. taser) implementations of the present invention are contemplated as within the scope of the present invention. The invention is thus to cover all modifications, equivalents, and alternatives falling within the spirit and scope of the following claims.

Claim elements and steps herein may have been numbered and/or lettered solely as an aid in readability and understanding. Any such numbering and lettering in itself is not intended to and should not be taken to indicate the ordering of elements and/or steps in the claims.

What is claimed is:

1. A method comprising the steps of:
   establishing at a deterrent device a first wireless communications link with a mobile computing device, wherein said deterrent device is not said mobile computing device and said mobile computing device is not included in said deterrent device;
   wherein said the first wireless communication link utilizes a Bluetooth protocol and the mobile computing device is a smart phone;
   receiving at said deterrent device a user indication to initiate a deterrent;
   activating an image capture device component of said deterrent device to capture at least one image in response to the said user indication to initiate said deterrent;
   transferring at least said image, via said first wireless communications link, from said deterrent device to said mobile computing device in which said mobile computing device establishes a connection via a second communication link to at least an emergency contact and at least transmits said image and user information to said emergency contact via said second communication link; and
   initiating in response to said user indication to initiate said deterrent a releasing of said deterrent from said deterrent device, wherein in said deterrent comprises a repellent spray.

2. The method as recited in claim 1, further comprising broadcasting an audible alert in response to said user indication to initiate said deterrent.

3. The method as recited in claim 1, further comprising receiving at said deterrent device a user indication to signal a medical emergency, and communicating said user indication to signal the medical emergency via said first wireless communication link to said mobile computing device in which said mobile computing device transmits via said second communication link said user indication to signal the medical emergency and said user information to at least said emergency contact.

4. The method as recited in claim 1, wherein said emergency contact includes a personal user contact.

5. The method as recited in claim 1, in which said mobile computing device transmits to said emergency contact via an Internet communication.

6. The method as recited in claim 1, wherein said user information at least comprises a location determined using GPS.

7. The method of claim 1, wherein said emergency contact includes an emergency responder.

8. The method of claim 1, wherein said emergency contact includes a monitoring service.

9. An apparatus comprising:
   a processor being configured to be operable for monitoring a user's interactions with the apparatus, controlling functions of the apparatus in response to the user's interactions, and establishing communications to an external mobile computing device, wherein said apparatus is not said external mobile computing device and said external mobile computing device is not included in said apparatus;
   a deterrent initiator unit configured to receive a user indication to initiate a deterrent;
   a camera unit configured to capture at least one image, said camera unit being further responsive to said processor for activation of said image capturing
   in which said processor activates said camera unit and captures said image in response to said user indication to initiate said deterrent;
   a wireless communications unit configured to establish a first wireless communications link to said external mobile computing device, said wireless communications unit being further responsive to said processor for transferring said captured image to said mobile computing device to be further transmitted via a second communication link to at least an emergency contact along with user information;

wherein said the first wireless communication link utilizes a Bluetooth protocol and the mobile computing device is a smart phone; and a deterrent release unit configured to release said deterrent in response to said user indication to initiate said deterrent, in which said deterrent comprises a repellent spray.

10. The apparatus as recited in claim 9, further comprising:
an audio unit configured to broadcast at least an audible alert in response to said user indication to initiate said deterrent.

11. The apparatus as recited in claim 9, wherein said emergency contact includes a monitoring service.

12. The apparatus as recited in claim 9, in which said mobile computing device transmits to said emergency contact via an Internet communication.

13. The apparatus as recited in claim 9, wherein said user information at least comprises a location determined using GPS.

14. The apparatus as recited in claim 9, in which said mobile computing device comprises a smart phone.

15. A non-transitory computer-readable storage medium with an executable program stored thereon, wherein the program instructs a processor to perform the following steps:

establishing at a deterrent device a first wireless communications link with a mobile computing device, wherein said deterrent device is not said mobile computing device and said mobile computing device is not included in said deterrent device;

receiving at said deterrent device a user indication to initiate a deterrent an;

activating an image capture device component of said deterrent device to capture at least one image in response to said user indication to initiate said deterrent;

transferring at least said image, via said first wireless communications link, from said deterrent device to said mobile computing device in which said mobile computing device establishes a connection via a second communication link to at least an emergency contact and at least transmits said image and user information user to said emergency contact via said second communication link;

wherein said the first wireless communication link utilizes a Bluetooth protocol and the mobile computing device is a smart phone; and initiating in response to said user indication to initiate said deterrent a releasing of said deterrent from said deterrent device, wherein said deterrent comprises a repellent spray.

16. The program instructing the processor as recited in claim 15, further comprising the step of broadcasting an audible alert in response to said user indication to initiate said deterrent.

17. The program instructing the processor as recited in claim 15, further comprising receiving at said deterrent device a user indication to signal a medical emergency, and communicating said user indication to signal the medical emergency via said first wireless communication link to said mobile computing device in which said mobile computing device transmits via said second communication link said user indication to signal the medical emergency and said user information to at least said emergency contact.

18. The program instructing the processor as recited in claim 15, wherein said emergency contact includes a monitoring service.

\* \* \* \* \*